A. G. WATKINS.
BOX.
APPLICATION FILED MAY 11, 1914.
1,134,569.
Patented Apr. 6, 1915.
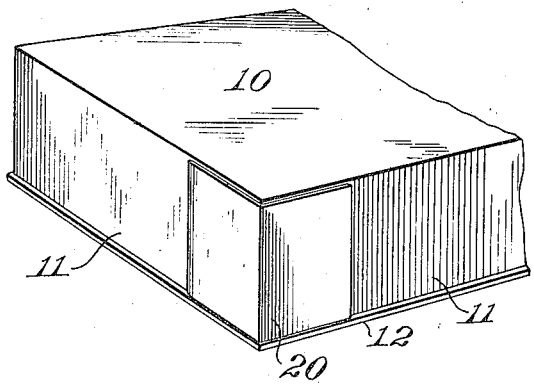
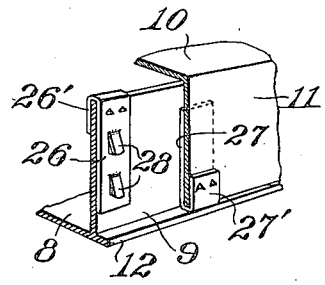
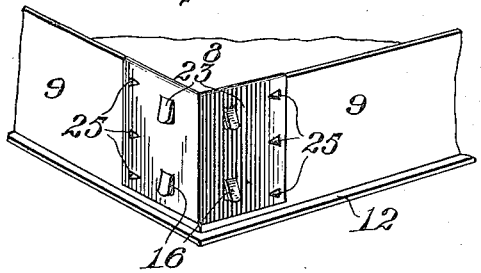
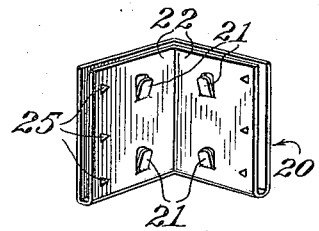
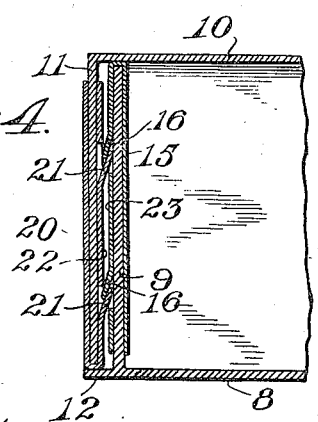
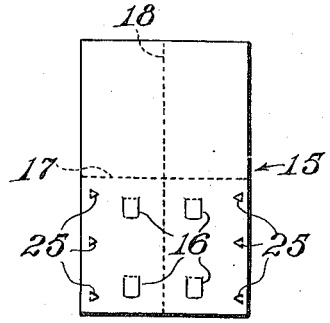
Inventor
Arthur G. Watkins,
Witnesses
N. O. Freeman
H. S. McDowell
by
J. Stuart Freeman,
Attorney

UNITED STATES PATENT OFFICE.

ARTHUR G. WATKINS, OF PHILADELPHIA, PENNSYLVANIA, ASSIGNOR OF ONE-HALF TO CHARLES L. RENZ, JR., AND ONE-HALF TO WILLIAM N. JARVIS, BOTH OF PHILADELPHIA, PENNSYLVANIA.

BOX.

1,134,569.  Specification of Letters Patent.  Patented Apr. 6, 1915.

Application filed May 11, 1914. Serial No. 837,622.

*To all whom it may concern:*

Be it known that I, ARTHUR G. WATKINS, a citizen of the United States, and a resident of the city of Philadelphia, county of Philadelphia, and State of Pennsylvania, have invented certain new and useful Improvements in Boxes, and of which the following is a full, clear, and exact disclosure.

In several of the trades, particularly in the confectionery business, makers of fine candies experience a great annoyance and injury both financially and by reputation, through the fraudulent re-use of their boxes for palming off inferior goods upon the public. Efforts have repeatedly been made to stop this practice but without success, wherefore, the present invention.

The object is to provide a box, and particularly an attachment for the same, which to open, after once being closed, necessitates a certain degree of mutilation of the same, which prevents its re-use.

Another object is to provide an attachment which can be readily secured upon wooden, tin, pasteboard, or other, box and lid members just prior to filling the former, after which, the simple act of pressing the lid into place secures the same upon said box.

Still another object is to provide a device of this character which, on being secured to and made a unitary part of a box, operates to strengthen the angular portions of the latter.

Further objects and advantages of the invention are fully brought out in the following specification when read in conjunction with the accompanying drawings, in which—

Figure 1 is a perspective view of the preferred embodiment of the invention applied to a common form of candy box; Fig. 2 is a perspective view of the box member; Fig. 3 is a similar view of the lid member; Fig. 4 is a vertical section on the line 4—4 of Fig. 2; Fig. 5 is a plan view of the metallic blank from which either of the box or lid members is formed; and Fig. 6 is a perspective view of a modified form of the invention and showing its application to two box and lid members.

Referring to the drawing, a box comprises in general a bottom or box member 8 bounded by upwardly extending sides 9, while the lid 10 is bounded by downwardly extending sides 11. The bottom may be provided with or without the peripheral flange 12, as may be desired.

As shown in Fig. 5, a substantially rectangular metal blank 15 is provided with any desired number of outwardly struck lugs or notches 16, said blank then being doubled along the dotted line 17 and in this form bent angularly along the dotted line 18. Exactly similar to this blank is a second blank 20 folded and bent in the same manner and provided with lugs 21 upon the inner sides 22 of the angular surfaces and positioned, so as to coöperate with the oppositely directed lugs 16 on the outer sides 23 of the blank 16. If the lugs 16 are narrow, the lugs 21 are relatively broad, to insure the coöperation one with the other, or vice versa, as the lid may move transversely with respect to the box. The usual practice is to separate the box and lid member as needed and slip over the corresponding corners of each, previously folded and bent blanks, after which any desired form of punch (not shown) is employed to cut suitably shaped teeth 25 in either or both the inner and outer sides thereof, and force the same inwardly from said members into the fiber construction of the respective box and lid sections, to permanently retain said members in place. Upon the box being filled with the goods, the lid is laid thereon, and, as the latter is pressed downwardly thereover, the lugs on the respective lid and box locking members pass over each other, each springing outwardly from the plane of its support and assuming a position such that any attempt to remove the lid is resisted by the locking of the respective pairs of oppositely directed lugs, as shown in Fig. 4. The metal used is relatively thin and separates the sides of the lid from the adjacent sides of the box to a slight degree only. Also, in conjunction with this locking mechanism, many different devices may be employed for removing a part or all of the plane face of the lid by mutilating a picture, reading matter, etc., in such a way as to make a perfect and imperceptible replacement of the lid, or removed portion thereof, absolutely impossible. To enhance the appearance of the locking members secured to the lid, the outer surfaces of the former may be polished, chased, or otherwise ornamented.

In the modified form of the device, shown in Fig. 6, similar metallic members 26 and 27 are secured to the bottom and lid respectively, of a box, each comprising reversely bent sections 26' and 27' located upon the opposite sides of their respective adjacent members. Said members are secured in place as in the preferred form of the device, while similar lugs 28 project from each and coöperate with the opposed lugs on the other, as hereinbefore described. In this form the device is preferably secured midway along the opposite sides or ends of the box members. It is also in this case possible to secure one of the locking members to the bottom box member at the factory before shipping the same to the candy manufacturer, where the other locking member is added to the lid.

Having thus described my invention, what I desire to protect by Letters Patent of the United States is:

1. A box locking mechanism, comprising a pair of metallic members, each adapted to be secured to and doubled to surround one of two adjacent edges of a box and a lid therefor, and outwardly projecting, coöperating, resilient lugs struck out from the adjacent sides of each of said members.

2. The combination of a box and a lid therefor, with a pair of metallic members, one of which is secured to and doubled around an edge of said box, the other being secured to and doubled around the adjacent edge of said lid, and outwardly projecting, coöperating, resilient lugs struck out from the adjacent sides of each of said box and lid members.

3. A box locking mechanism, comprising a pair of metallic members, each lying in a single plane and adapted to be secured to the respective adjacent edge portions of a box and lid therefor, and outwardly projecting, substantially rectangular, coöperating, resilient lugs, struck out from the adjacent sides of each of said members.

In witness whereof, I have hereunto set my hand this 19th day of March, A. D. 1914.

ARTHUR G. WATKINS.

Witnesses:
CHARLES J. CRESWELL,
WILLIAM T. TRIKON.